United States Patent [19]
Suzuki
[11] 4,381,511
[45] Apr. 26, 1983

[54] PRINTING DEVICE FOR A TIME RECORDER

[75] Inventor: Masamichi Suzuki, Yokohama, Japan
[73] Assignee: Amano Corporation, Yokohama, Japan

[21] Appl. No.: 259,053
[22] Filed: Apr. 30, 1981
[30] Foreign Application Priority Data
May 2, 1980 [JP] Japan ............................ 55-60757[U]
[51] Int. Cl.³ ............................................... G01D 9/00
[52] U.S. Cl. ........................................ 346/20; 346/82
[58] Field of Search ...................... 346/82, 95, 141, 20

[56] References Cited
U.S. PATENT DOCUMENTS
3,952,313 4/1976 Willmann et al. .................... 346/82
4,270,043 5/1981 Baxter et al. ..................... 346/82 X

*Primary Examiner*—George H. Miller, Jr.
*Attorney, Agent, or Firm*—Wenderoth, Lind & Ponack

[57] ABSTRACT

A printing device for a time recorder in which printing operation is performed on a preselected printing column of a time card by means of a dot printer, while the latter is transversely displaced by a distance equal to the width of a printing column of the time card inserted into a card pocket.

7 Claims, 9 Drawing Figures

PRINTING DEVICE FOR A TIME RECORDER

BACKGROUND OF THE INVENTION

1. Field of the Invention

The present invention relates to an improved printer incorporated in a time recorder and more particularly relates to a printing device in which printing operation is performed on a time card by means of a wire type dot printer (hereinafter referred to as dot printer) comprising a plurality of printing wires to be driven for printing in a matrix pattern under control effected by magnets.

2. Description of the Prior Art

The conventional printing device for a time recorder in which printing operation is performed by means of the dot printer as described above is typically constructed such that when a time card is inserted into a card pocket the dot printer is transversely displaced across the full width of the inserted time card and performs a predetermined printing only on a preselected printing column thereof in accordance with a command signal from the respective magnets which are energized by a control mechanism during the transverse displacement of the dot printer. However it has been pointed out as drawbacks with the conventional printing device that the dot printer transverse displacement mechanism as well as the printing operation command signal control mechanism are very complicated in structure and expensive to manufacture. Further, another drawback is that there is a necessity for a separate mechanism for turning the dot printer backwards when the latter is located in front of a printing column where no printing is required during the transverse displacement thereof. This causes the printing device to be additionally complicated in structure and moreover take a longer time until the dot printer has completed transverse displacement and printing operation. As a result there often occur misprinting in the form of inclined arrangement of letters caused by removal of the time card during the printing operation.

SUMMARY OF THE INVENTION

Thus, it is a principal object of the present invention to provide a printing device incorporated in a time recorder which is constructed such that a dot printer is transversely displaced just across the width of a certain printing column of a time card inserted into a card pocket on which the required printing is to be effected, whereby a dot printer displacement mechanism as well as a printing operation command control mechanism are substantially simplified without any necessity for the above-described dot printer turning mechanism and printing operation is completed in a shortened period of time with substantially reduced possibility of incorrect printing caused by early removal of the time card.

It is another object of the present invention to provide a printing device incorporated in a time recorder which is constructed such that the dot printer is transversely displaced just across the width of a single column on the inserted time card by way of the step of one rotation of a specially designed cam disc and thereafter automatically resumes its original start position.

To accomplish the aforesaid objects there is proposed in accordance with the present invention a printing device for a time recorder which is constructed such that a card pocket for a time card to be inserted therein transversely slides to locate a dot printer just in front of a preselected printing column of the time card and a printer base with the dot printer mounted thereon is provided with two guide rollers which are extended downwards therefrom in a spaced relation, while a heart-shaped elliptic cam disc is rotatably arranged between the two guide rollers, whereby the dot printer is transversely displaced together with the printer base by a distance equal to the width of the preselected printing column by way of the step of one rotation of the cam disc effected after inserting the time card into the card pocket and then is automatically returned to the start position.

BRIEF DESCRIPTION OF THE ACCOMPANYING DRAWINGS

Now the present invention will be described in more detail with reference to the accompanying drawings which illustrates a preferred embodiment of the invention, in which.

DETAILED DESCRIPTION OF THE PREFERRED EMBODIMENT

Figure 1:
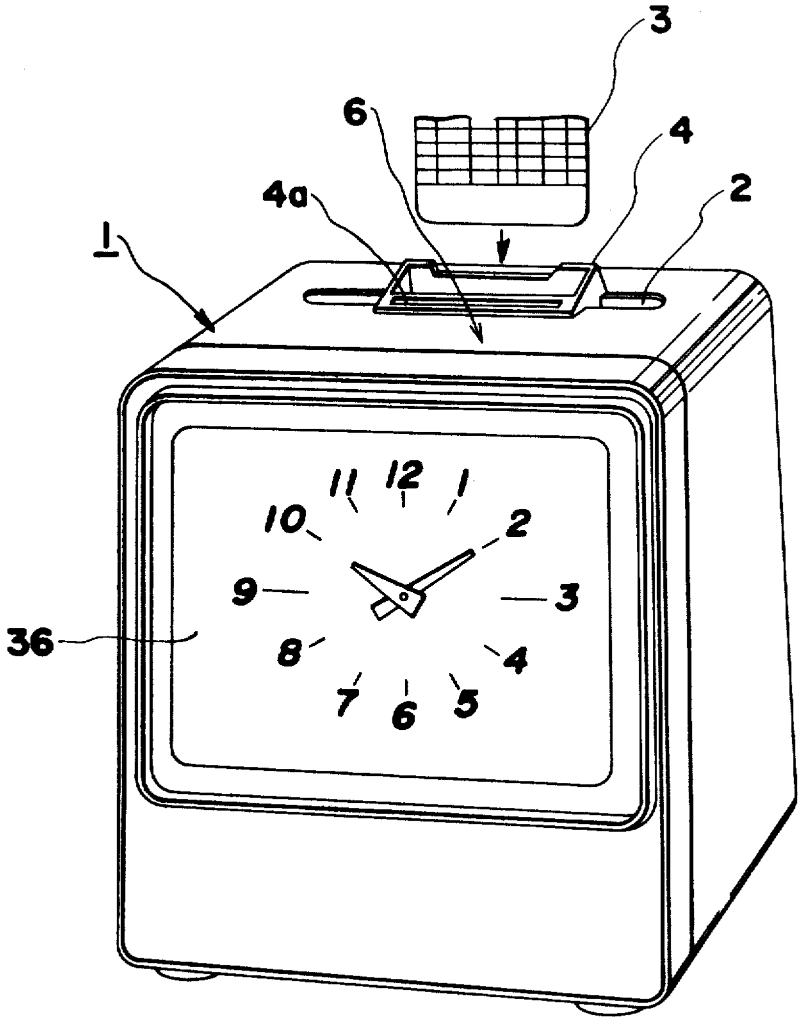
FIG. 1 is a perspective view of a time recorder in which the present invention is practiced.
Figure 2:
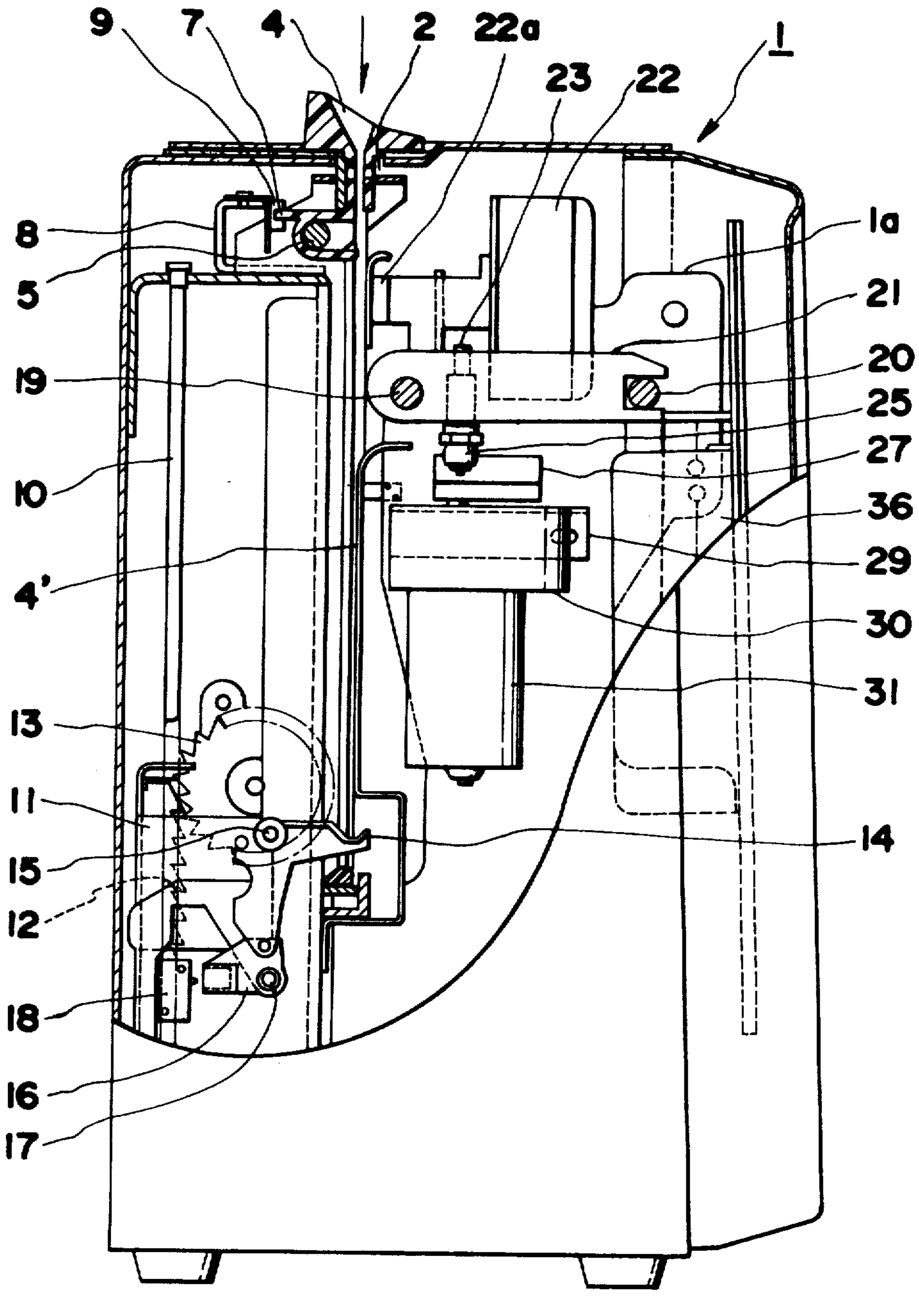
FIG. 2 is a partially sectioned side view of the time recorder shown in FIG. 1.

FIG. 1 is a perspective view of a typical time recorder in which the present invention is practiced. As readily seen from the drawing, the time recorder generally designated by the reference numeral 1 is formed with a transversely extending slide slot 2 at its upper surface, said slide slot 2 being adapted to receive a card pocket 4 through which a time card 3 is to be inserted. As illustrated in FIG. 2, the card pocket 4 is designed so as to transversely move within the slide slot 2 along a slide shaft 5 which is transversely extended in the time recorder 1.

Now the aforesaid time card 3 will be briefly described below.

Figure 9:
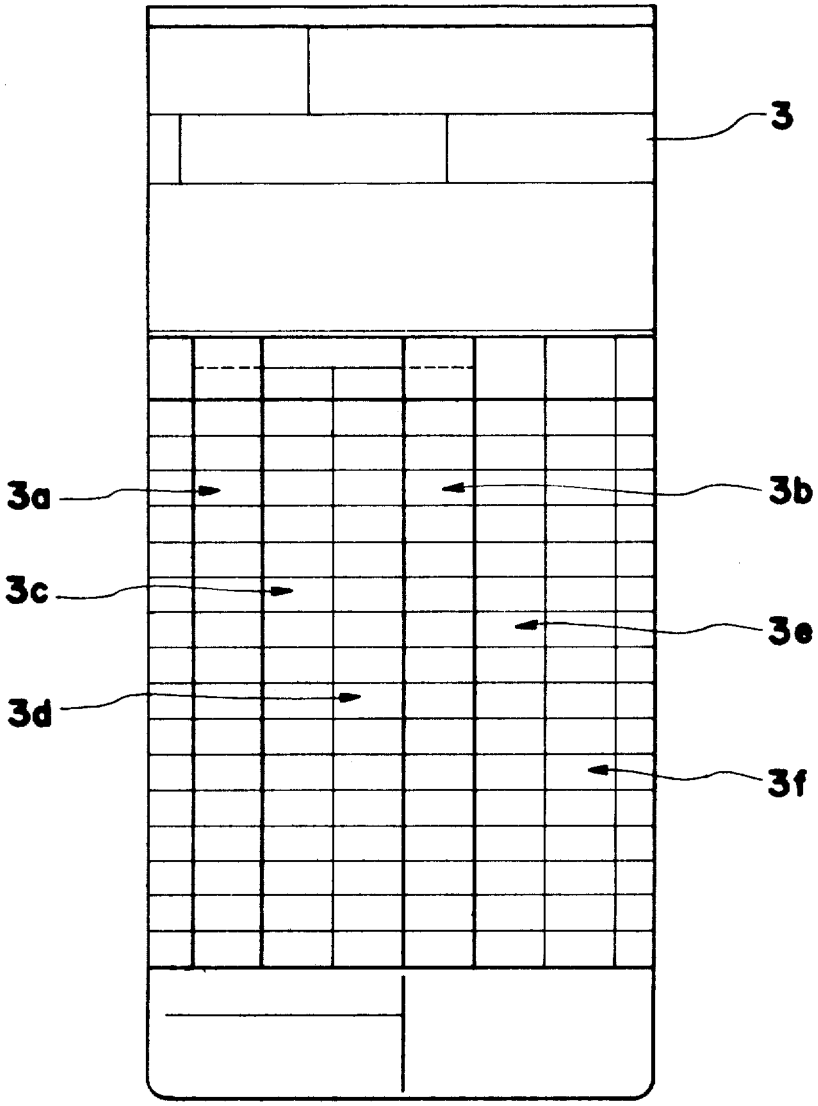
FIG. 9 is a front view of a time card which can be used with the time recorder of the invention, wherein a number of columns are not provided with a printed designation, for the purpose of simplification.

As typically illustrated in FIG. 9, the time card 3 is usually designed such that it contains a number of printing columns such as company arrival time column **3*a*, company leaving time column 3*b*, early leaving time column 3*c*, late arrival time column 3*d*, extra working time column 3*e* and other unidentified time columns, each of which has a width as wide as 12 mm. Further as illustrated in FIG. 1, the card pocket 4 has a display section 4*a* formed on the upper surface thereof which contains a plurality of displays in the form of combined letters (not shown) which correspond to the aforesaid printing columns. Thus, by displacing the card pocket 4 to locate a certain display on the aforesaid display section 4*a* in alignment with an indication mark 6 on the upper surface of the time recorder 1 it is ensured that the time card 3 inserted in the card pocket 4** is located at a predetermined printing position on the printing column such as company arrival time column 3*a* on which printing operation is conducted by means of a dot printer to be described below. It should be noted that the aforesaid printing position on the card pocket 4 is firmly held by way of resilient engagement of a selector rack 7 on the card pocket 4 to a leaf spring stopper 9 fixedly secured to a frame 8 in the time recorder 1 (see FIG. 2).

In FIG. 2, the reference numral 10 designate a guide stem which is vertically extended in the time recorder 1, guide stem 10 being provided with a sliding frame 11 which contains a rack 12 formed thereon, sliding frame 11 being mounted on the guide stem 10 slidably in the vertical direction. The reference numeral 13 designates a ratchet wheel in engagement with the rack 12 by means of which the sliding frame 11 is raised up by one step per day for the purpose of changing a printing column and the reference numeral 14 designates a card receiving lever pivotally secured to the sliding frame 11 at its right end by means of a shaft 15. The right end of the card receiving lever 14 is located in alignment with a guide passage 4' which is an extension of the opening of the card pocket 4. When the time card 3 is inserted and thereby the card receiving lever 14 is rotated by the lower end part of the inserted time card 3, an engagement piece 16 is rotated about a shaft 17 whereby a microswitch 18 fixedly secured to the slide frame 11 is turned on. Once the microswitch 18 is turned on in that way, printing operation is initiated by means of a printing section which will be described below.

Figure 3:
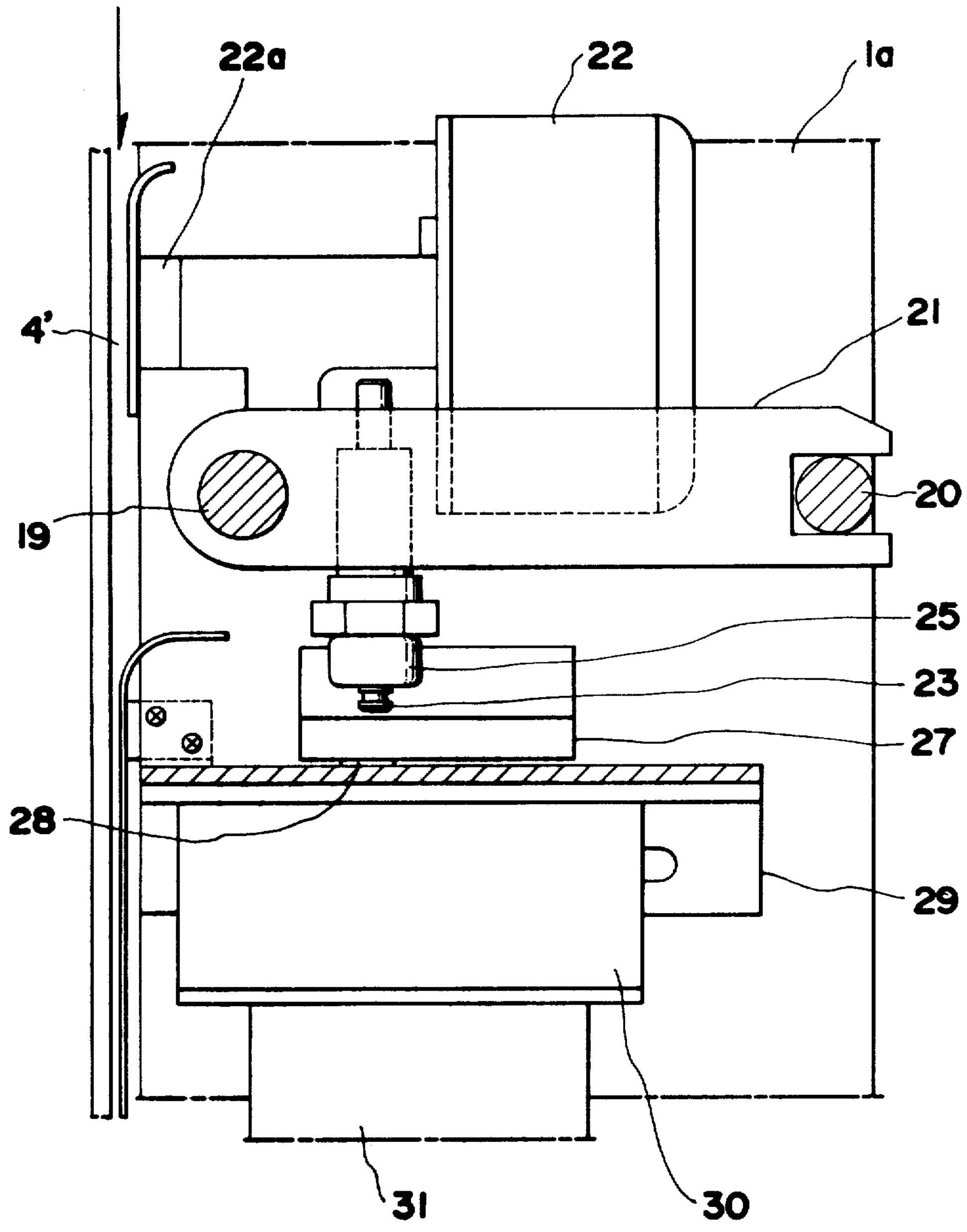
FIG. 3 is a sectional side view of an essential part of the time recorder, shown in an enlarged scale.
Figure 4:
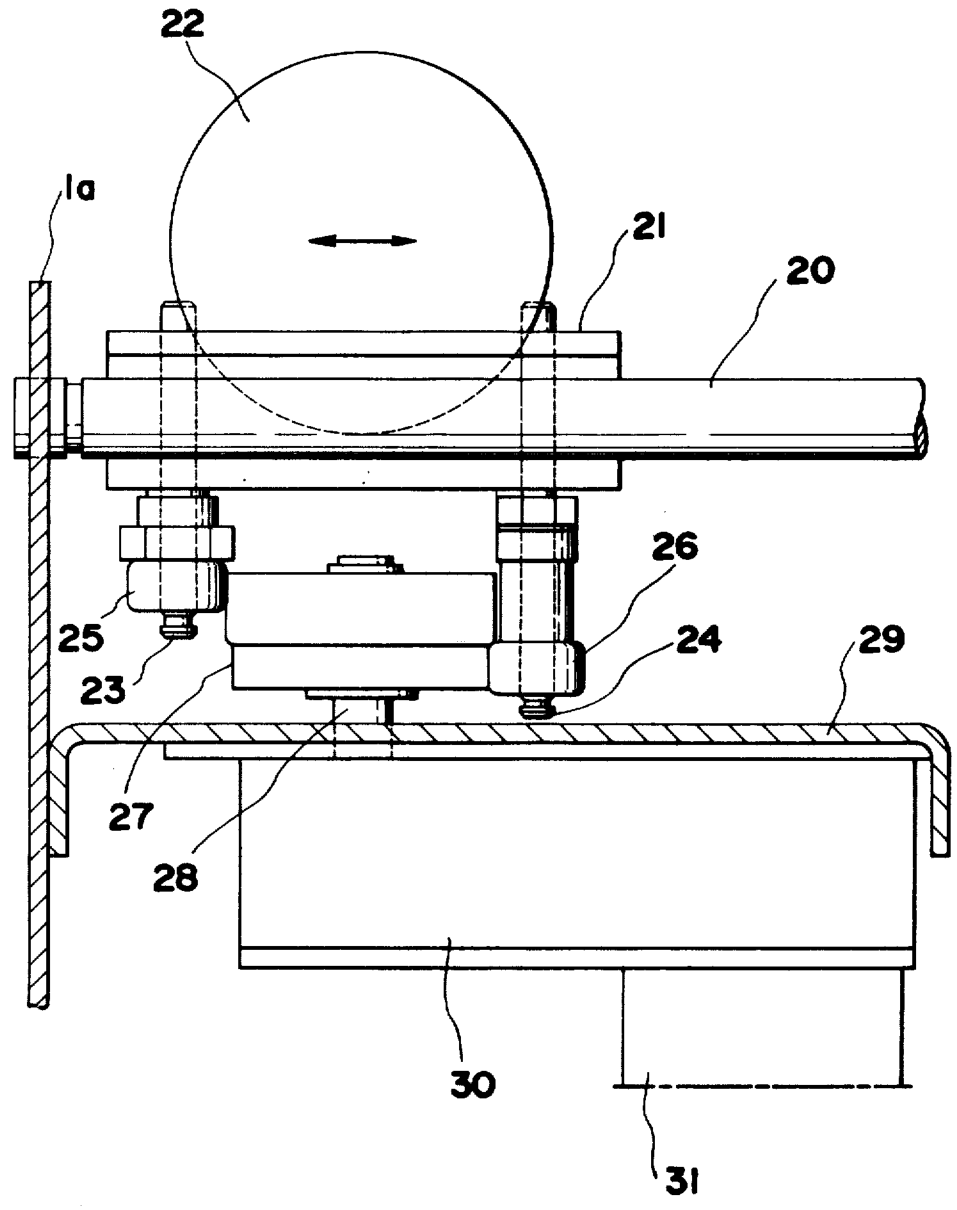
FIG. 4 is a sectional front view of the aforesaid essential part of the time recorder shown in FIG. 3.

Now the aforesaid printing section will be described in greater detail with reference to FIGS. 2 to 4. The reference numerals 19 and 20 designate guide rods which horizontally extend between the frames 1*a* in the time recorder 1, and the reference numeral 21 designates a printer base which is mounted between the guide rods 19 and 20 in the following manner. Specifically, printer base 21 is adapted to transversely move in parallel to the printing face of the time card 3 inserted through the guide passage 4' of the card pocket 4, while being guided by means of both the guide rods 19 and 20. On the upper surface of the printer base 21 is fixedly arranged a dot printer 22 of which printing head 22*a* is directed toward the guide passage 4' (more particularly toward the printing face of the time card 3 inserted through the guide passage 4'). Further the reference numerals 23 and 24 designate roller shafts which extend downwards from the printer base 21 in parallel to one another in a spaced relation, roller shafts 23 and 24 having guide rollers 25 and 26 rotatably fitted thereon. The reference numeral 27 designates a heart-shaped elliptic cam disc which is disposed between the guide rollers 25 and 26, whereas the reference numeral 28 designates a driving shaft by means of which said cam disc 27 is rotated. The driving shaft 28 is rotated at a reduced rotational speed by way of a combination of a reduction gearing mechanism 30 and a motor 31, both of which are fixedly secured to a bracket 29 at the central area of the time recorder 1. As the cam disc 27 is rotated by means of the shaft 28, the guide rollers 25 and 26 are thrusted by the cam disc 27, causing the printer base 21 to transversely move along the guide rods 19 and 20, whereby the dot printer 22 is ready to perform printing on the printing face of the time card 3 inserted in the card pocket 4 at the predetermined location where the printer base 21 has reached by way of transverse movement.

Figure 5:
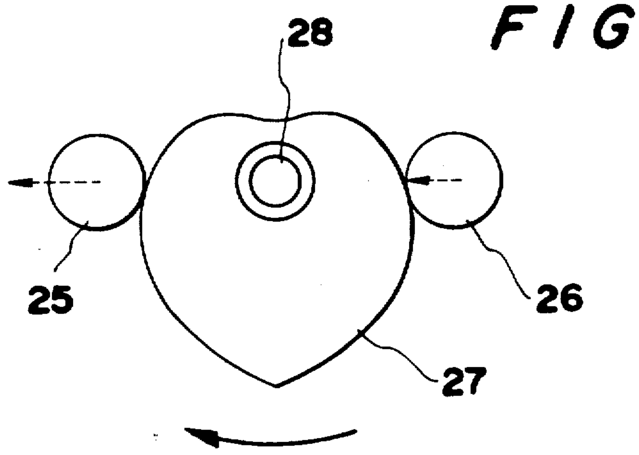
FIGS. 5 to 7 are views schematically illustrating different rotational positions of the cam disc in accordance with the invention.
Figure 7:
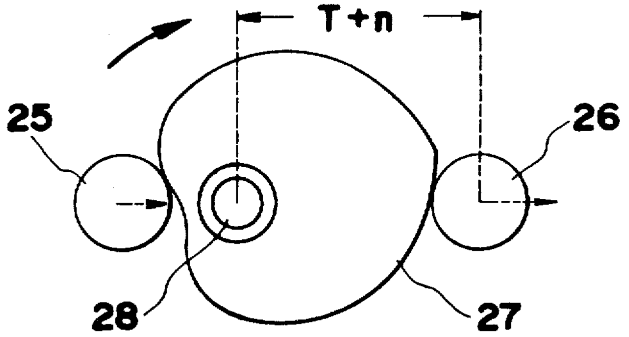

FIGS. 5 and 7 are schematic illustrations of the operation of the aforesaid cam disc 27 in different rotational location respectively. As readily seen from the drawings, the cam disc 27 is designed in the form of a heart-shaped ellipse and is carried by the driving shaft 28 at the top end thereof in an eccentric location relative to the center of the ellipse.

FIG. 5 illustrates the operational position of the cam disc 27 at the starting time (when the cam disc is at rest). As the cam disc 27 starts its rotation from the aforesaid rest position in the direction as indicated with an arrow mark (in the clockwise direction), the left-hand guide roller 25 is thrusted by the cam face to move to the left as illustrated by the arrow mark in the drawings, whereby the dot printer 22 is displaced toward the printing start position together with the printer base 21.

Figure 6:
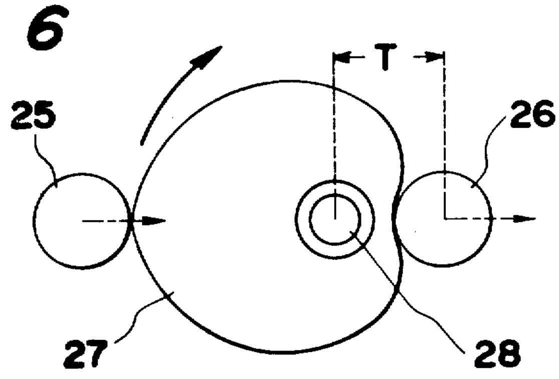

Next, FIG. 6 illustrates other operational position of the cam disc 27 where the latter is rotated by a quarter of rotation, that is, by about 90 degrees and thereby the dot printer 22 has reached the printing start position. The dot printer 22 starts its printing operation on the time card 3 at this operational position. Further as the cam disc 27 is rotated in the direction as indicated with the arrow mark, the right-hand guide roller 26 is thrusted by the cam disc 27 to move to the right. Thus the dot printer 22 is transversely displaced to the right, while performing the printing operation, whereby transverse printing comprising the intended combination of printed letters is achieved in the form of dot matrix pattern on the predetermined printing column of the time card 3.

Next, FIG. 7 illustrate another operational position of the cam disc 27 where the latter is located just before completion of transverse printing operation. When assuming that the distance between the cam shaft 28 and the righthand guide roller 26 at the printing start time is defined by T as illustrated in FIG. 6, the corresponding distance therebetween is widened to T+n, when the operational position in FIG. 7 is reached. The result is that the printer 22 is transversely displaced by a distance of n (printing is effected during the transversal displacement). As a rule the above distance of n is specified to the same dimension as the width of the respective printing columns 3*a* to 3*f*. Thus the distance of the transverse displacement of the dot printer 22 achieved by one rotation of the cam disc 27 (width of a printing column) usually amounts to 12 mm.

When the cam disc 27 is rotated by one-half rotation, that is, by 180 degrees from the operational position as illustrated in FIG. 6, transverse printing displacement is completed by the dot printer 22. Further when the cam disc 27 is subsequently rotated by a residual quarter of rotation, the dot printer 22 resumes the starting position as illustrated in FIG. 5 in association with the left-hand guide roller 25. After completion of one rotation of the cam disc 27 in the above-described manner the whole transverse printing displacement is accomplished by the dot printer 22. As a result the dot printer 22 comes to a stop to be ready for next printing operation which will start from the operational position as illustrated in FIGS. 2 to 4.

Figure 8:
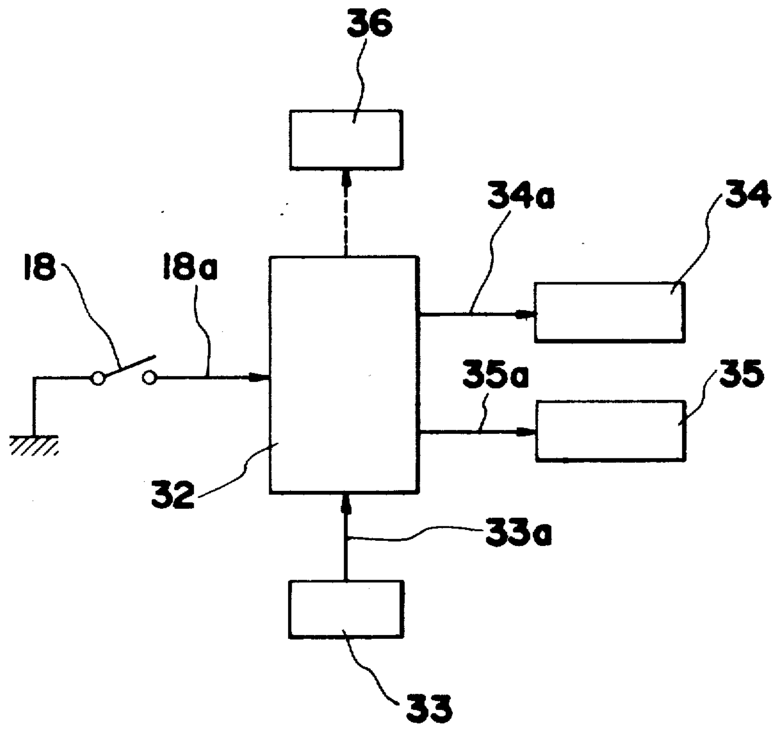
FIG. 8 is a block diagram which schematically illustrates a control mechanism for the invention.

FIG. 8 is a block diagram which is intended to briefly illustrate an example of a control mechanism for controlling operation of the aforesaid dot printer 22 and the motor 31. In the drawing, the reference numeral 32 designates a central processing unit comprising a microprocessor as a main component, processing unit 32 being provided with a storage section having electronic memories incorporated therein (not shown). Further the reference numeral 33 designates a clock circuit from which time signals are delivered to the central processing unit 32 via a signal line 33a, the time signals serving as a reference signal for controlling the respective sections. The central processing unit 32 functions such that it reads a variety of data previously stored in the storage section in response to ON-signals delivered from the aforesaid microswitch 18 via a signal line 18a, processes them and then allows their control signals to be delivered as input to a wire driving mechanism 34 in the dot printer 22 and a driving circuit 35 for the motor 31, so that rotation of the motor 31 and printing operation of the dot printer 22 are initiated. It is to be noted that in the drawing the reference numeral 36 designates a display clock.

Since the printing device for the time recorder in accordance with the present invention is designed and constructed in the above-described manner, printing operation is performed by way of the following steps.

First, the card pocket 4 is displaced to selectively determine a printing column. After completion of selection of the printing column, the time card 3 is inserted into the guide passage 4' of the card pocket 4. When the inserted time card 3 depresses the card receiving lever 14, the microswitch 18 is turned on and thereby the central processing unit 32 starts a processing operation. The central processing unit 32 controls the driving circuit 35 of the motor 31 and which initiates rotation of the motor 31. As the motor 31 is rotated, the cam disc 27 is correspondingly rotated, whereby the dot printer 22 performs printing operation, while being transversely displaced. During the printing and displacement as described above, the printing wires of the dot printer 22 are selectively actuated in accordance with the signals delivered from the central processing unit 32 to the wire driving mechanism 34 when detecting the printing timing and location. As a result, the required working data are printed on the predetermined printing column of the time card 3. The distance by which the dot printer 22 is displaced by means of the cam disc 27 while performing the printing operation is specified to the same dimension (for instance, 12 mm) as the width of the printing column on the time card 3, the printing column being selectively determined by way of the transverse movement of the card pocket 4. Hence, when it is necessary to change the location of the printing column, the card pocket 4 is again displaced in such a manner that the designation on the display section 4a is located in alignment with the indication mark 6 so that the preselected printing column is exactly set to the required printing position of the dot printer 22.

As described above, the printing device incorporated in the time recorder in accordance with the present invention operates so that printing operation is conducted with the predetermined printing column located in alignment with the printing position of the dot printer, the alignment being achieved by way of the step of displacing the card pocket transversely relative to the time recorder and so that the distance of printing displacement of the dot printer is very short, for instance, 12 mm, because it has the same dimension as the width of the respective printing columns on the time card. Also, the mechanism for transversely displacing the dot printer is constructed in a very simple manner merely by the above described combination of the cam disc, guide rollers and printer base. Thus, the dot printer transverse displacement mechanism as well as the printing operation command signal control mechanism are designed and constructed in a substantially simpler structure than those in the conventional printing apparatus which is designed such that a dot printer moves long distance equal to the full width of a time card each time the time card is to be printed upon. Further, since the printing device of the invention has no necessity for a dot printer turning mechanism by means of which the dot printer is kept away from the location where no printing is required during the transverse printing displacement, it is possible to construct the printing section in a remarkably simple manner, which allows the whole time recorder to be easily and inexpensively manufactured and assembled.

Furthermore, since the dot printer of the invention is constructed such that transverse printing displacement extends on a distance equal to the width of the predetermined printing column on the time card as described above, the printing operation requires a reduced period of time to complete. This will contribute to substantial reduction of occurrence of incorrect printing caused by early removal of the time card. Owing to the simple structure of the printing device in accordance with the present invention the latter advantageously applicable to a various type of time recorders of the kind is provided with a dot printer.

What is claimed is:

1. A time recording device comprising:

(a) a frame;

(b) a card pocket for vertically receiving a time card, disposed in said frame and being horizontally, transversely displaceable therein;

(c) a dot printer having a printing head opposing the printing surface of the time card when the time card is in said card pocket, for printing on the printing surface of the time card in response to a print signal;

(d) printer guiding means, mounted to said frame, for slidably supporting said dot printer such that said dot printer is slidably movable horizontally and transversely of the printing surface of the time card a transverse distance which is short compared to the width of the time card;

(e) means, including a cam having a cam surface, a contact member engaging said cam surface, and means for rotating one of said cam and said contact member in response to a displacement signal, fixed to said dot printer and said frame, for reciprocally moving said dot printer said transverse distance when said rotary means is rotating said one of said cam and said contact member; and (f) means for providing said print signal to said dot printer and said displacement signal to said rotating means so that said dot printer is displaced said transverse distance as it prints on the printing surface of the time card, whereby the printing surface of the time card is printed upon along a horizontal segment thereof of substantially the same width as said transverse distance.

2. The time recorder as in claim 1, wherein said card pocket is horizontally, transversely displaceable a distance which is at least twice said transverse distance.

3. The time recorder as in claim 2, wherein said printer guiding means includes a printer base guiding member extending horizontally and transversely in said frame and a printed base fixed to said printer and slidably mounted on said printer base guiding member so as to face said card pocket.

4. The time recorder as in claim 2, wherein said contact member comprises a pair of spaced shafts having rollers for respectively engaging said cam surface on opposite sides of said cam, said cam comprising a cam disc mounted for rotation to said rotating means.

5. The time recorder as in claim 4, wherein said rotating means rotates said cam disc 360° in response to said displacement signal, and said cam disc is heart-shaped, said dot printer performing printing on the time card during a 180° of rotation of said cam disc.

6. A time recording device comprising:

(a) a frame;

(b) a card pocket for vertically receiving a time card having a plurality of vertical printing columns of predetermined width, said card pocket being disposed in said frame and being horizontally, transversely displaceable therein;

(c) a dot printer having a printing head opposing the printing surface of the time card when the time card is in said card pocket, for printing on the printing surface of the time card in response to a print signal;

(d) printer guiding means, mounted to said frame, for slidably supporting said dot printer such that said dot printer is slidably movable horizontally and transversely of the printing surface of the time card a transverse distance equal to the predetermined width of the columns of the time card;

(e) means, including a cam having a cam surface, a contact member engaging said cam surface and means for rotating one of said cam and said contact member in response to a displacement signal, fixed to said dot printer and said frame, for reciprocally moving said dot printer said transverse distance when said rotating means is rotating said one of said cam and said contact member; and (f) means for providing said print signal to said dot printer and said displacement signal to said rotating means so that said dot printer is displaced said transverse distance as it prints on the printing surface of the time card, whereby the printing surface of the time card is printed upon along a horizontal segment thereof of substantially the same width as said transverse distance.

7. The time recorder as in claim 6, wherein said card pocket is horizontally, transversely displaceable a distance equal to the total width of said plurality of printing columns.

* * * * *